United States Patent
Liu

(10) Patent No.: US 8,599,499 B2
(45) Date of Patent: Dec. 3, 2013

(54) HIGH-SPEED WIDE-ANGLE LENS CONSTRUCTION

(75) Inventor: Zhiqiang Liu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 67 days.

(21) Appl. No.: 13/425,172

(22) Filed: Mar. 20, 2012

(65) Prior Publication Data

US 2013/0250166 A1  Sep. 26, 2013

(51) Int. Cl.
| | |
|---|---|
| G02B 9/34 | (2006.01) |
| G02B 3/00 | (2006.01) |
| G02B 7/00 | (2006.01) |
| G02B 9/00 | (2006.01) |
| G02B 11/00 | (2006.01) |
| G02B 13/00 | (2006.01) |
| G02B 15/00 | (2006.01) |
| G02B 17/00 | (2006.01) |
| G02B 25/00 | (2006.01) |
| G02B 13/16 | (2006.01) |
| H04N 5/225 | (2006.01) |

(52) U.S. Cl.
USPC ........... 359/773; 348/335; 348/340; 359/642; 359/754; 359/771; 359/772

(58) Field of Classification Search
USPC ................ 348/294–324, 335–369, 373–376; 359/642–783
See application file for complete search history.

(56) References Cited

U.S. PATENT DOCUMENTS

| | | | |
|---|---|---|---|
| 5,132,848 A | 7/1992 | Nishio et al. | |
| 5,731,912 A * | 3/1998 | Abe | 359/691 |
| 6,825,993 B2 | 11/2004 | Noda | |
| 6,909,559 B2 * | 6/2005 | Nishina | 359/772 |
| 7,362,509 B2 * | 4/2008 | Takeuchi | 359/679 |
| 7,443,603 B2 | 10/2008 | Saori | |
| 7,697,210 B2 | 4/2010 | Lang et al. | |
| 2003/0138245 A1 * | 7/2003 | Watanabe | 396/72 |
| 2004/0136097 A1 * | 7/2004 | Park | 359/773 |
| 2005/0041302 A1 * | 2/2005 | Ozaki et al. | 359/680 |
| 2005/0248854 A1 * | 11/2005 | Takeuchi | 359/680 |
| 2006/0056068 A1 * | 3/2006 | Lee et al. | 359/781 |
| 2006/0103946 A1 * | 5/2006 | Nagai et al. | 359/680 |
| 2006/0274433 A1 * | 12/2006 | Kamo | 359/793 |
| 2007/0008625 A1 * | 1/2007 | Park et al. | 359/642 |
| 2007/0229973 A1 * | 10/2007 | Souma | 359/686 |
| 2008/0316614 A1 * | 12/2008 | Yamamoto | 359/676 |
| 2010/0044555 A1 | 2/2010 | Ohara et al. | |

(Continued)

OTHER PUBLICATIONS

"Lens Genealogy—Part 2", Retrieved at <<http://www.lensrentals.com/blog/2011/09/lens-genealogy-part-2>>, Sep. 13, 2011, pp. 12.

(Continued)

*Primary Examiner* — Michael Osinski
(74) *Attorney, Agent, or Firm* — Alleman Hall McCoy Russell & Tuttle LLP

(57) ABSTRACT

Embodiments are disclosed herein related to the construction of optical elements for an RGB camera system. One disclosed embodiment provides a wide-angle lens construction, comprising a first, negative stage, and a second, positive stage positioned behind the first, negative stage along an optical axis of the lens construction. The second, positive stage further comprises a first positive lens substage, a first negative lens substage, a second positive lens substage, and a second negative lens substage.

15 Claims, 3 Drawing Sheets

(56) References Cited

U.S. PATENT DOCUMENTS

| | | |
|---|---|---|
| 2010/0194853 A1 | 8/2010 | Matsusaka et al. |
| 2010/0265380 A1* | 10/2010 | Fukuta .......... 348/335 |
| 2011/0170195 A1* | 7/2011 | Muratani et al. ......... 359/601 |
| 2012/0147485 A1* | 6/2012 | Kubota .......... 359/794 |

OTHER PUBLICATIONS

Kumbler, et al., "Fisheye lens designs and their relative performance", Retrieved at <<http://1360vr.com/fisheye41/coastal-fisheyep.pdf>>, Proceeding of SPIE 4093, 2000, pp. 360-369.

\* cited by examiner

US 8,599,499 B2

HIGH-SPEED WIDE-ANGLE LENS CONSTRUCTION

BACKGROUND

Color image capture devices, which also may be referred to as RGB (Red, Green, Blue) cameras, may be used in a variety of different environments. For example, an RGB camera may be used with an interactive entertainment system to allow players to communicate with other players, and/or for machine vision and object recognition.

Wide-angle RGB cameras may utilize various lens constructions, including retro-focus and/or fish-eye types, to capture a wide field of view. However, with these constructions, as field angles increase, distortion increases. As such, with field angles of greater than 90 degrees, very large distortions may result. Further, such large angles may greatly increase the difficulty of eliminating lateral secondary color. These factors may degrade performance in many applications, including but not limited to color imaging, machine vision and object recognition.

The use of a greater number of lens elements, sometimes made of expensive glass materials, may in some situations help to compensate for such distortion. However, increasing the number of lens elements to correct for such aberrations may increase the cost of a lens system. As a result, costs may be quite high for wide angle lenses with a good modulation transfer function, low distortion, and low f-number.

SUMMARY

Embodiments are disclosed herein that relate to wide-angle, high speed RGB imaging lens assemblies for an RGB imaging system. For example, one disclosed embodiment provides an RGB imaging system comprising a lens construction having a first, negative stage, and a second, positive stage positioned behind the first, negative stage along an optical axis of the lens construction. The second, positive stage comprises, in order along the optical axis of the lens construction, a first positive lens substage, a first negative lens substage, a second positive lens substage, and a second negative lens substage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed that relate to facilitating RGB camera imaging in wide-angle applications, even in light-starved conditions. Briefly, the disclosed embodiments may provide a relatively lower relative aperture (f/#) and wider field of view than conventional retro-focus and fish-eye wide-angle lens constructions. In some embodiments, an f-number less than or equal to 2.0 and a field of view (FoV) greater than or equal to 90° may be achieved.

Figure 1:
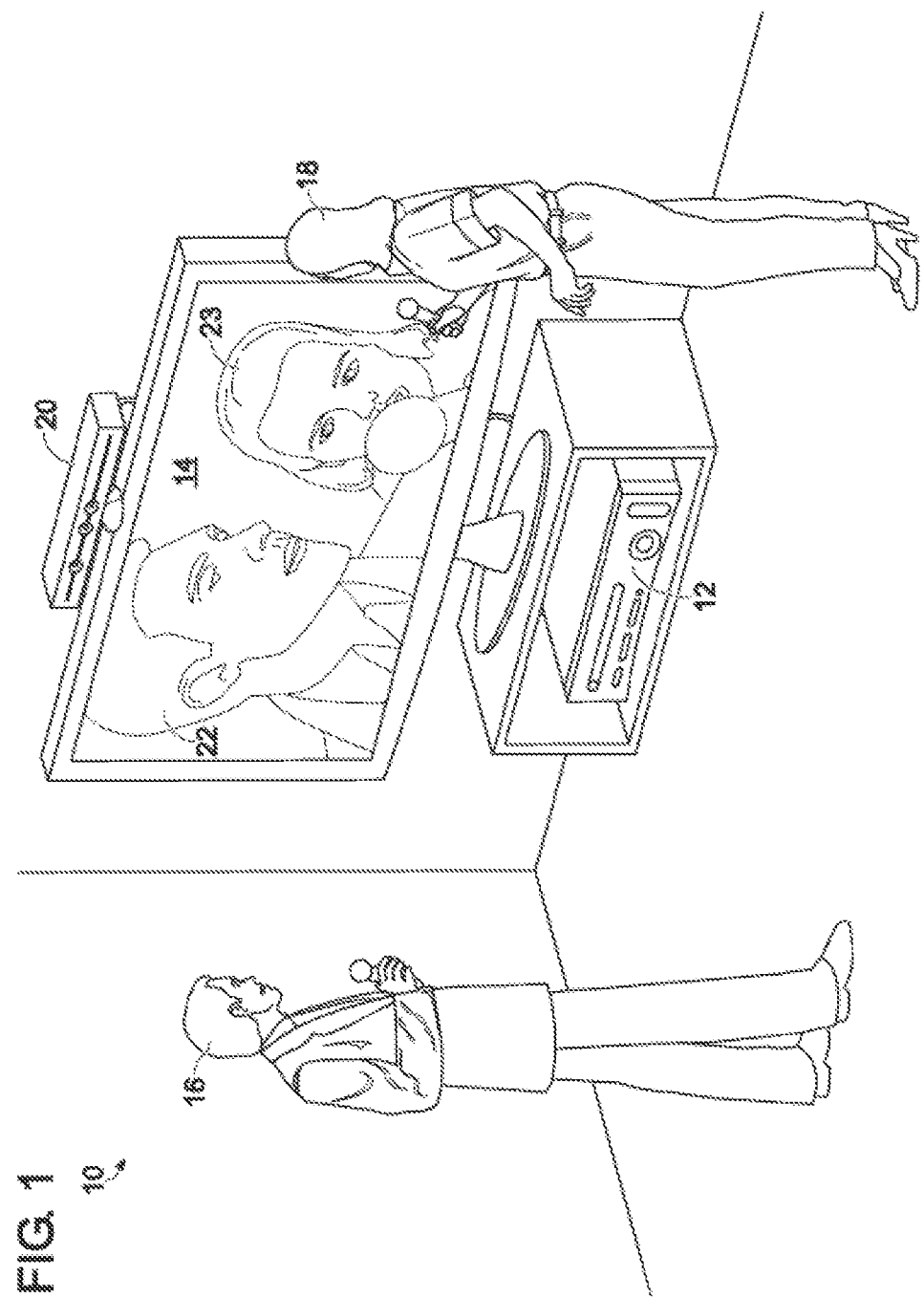
FIG. 1 shows an example embodiment of use environment for an RGB imaging system.

Before discussing the disclosed embodiments of lens systems in detail, an example use environment 10 for an RGB camera system is described with reference to FIG. 1. In particular, FIG. 1 shows a computer gaming system 12 that may be used to play a variety of different games, play one or more different media types, and/or control or manipulate non-game applications. FIG. 1 also shows a display 14 that may be used to present visuals to users, such as users 16 and 18. Furthermore, FIG. 1 shows a camera system 20 used to monitor environment 10. Camera system 20 may comprise a wide-angle, high speed RGB camera, and in some embodiments may also include a depth camera. As shown in FIG. 1, camera system 20 may capture an image or video of an environment including, for example, users 16 and 18, and display avatars 22 and 23 representing realistic images of users 16 and 18 on display 14 based upon RGB data, and potentially depth data. It will be understood that the example use environment 10 of FIG. 1 is presented for the purpose of example, and is not intended to be limiting in any manner.

As shown in FIG. 1, in some situations, users of a RGB camera system may be spaced widely apart. In the specific example of FIG. 1, users 16 and 18 are playing a singing-based video game. In such a game, gesture-based inputs of the users may be tracked via depth data, while RGB data may be used to render avatars of the users, to identify users via facial recognition, and/or for other purposes. During game play, users 16 and 18 may move about the use environment, rather than standing consistently close together. As such, the use of a wide-angle RGB camera system may help to ensure that users 16 and 18 can be continuously tracked even when they are spaced widely apart. The disclosed embodiments also may allow such tracking to occur even in low light conditions, and may avoid distortions and other aberrations from interfering with robust user imaging across the field of view of the camera system.

Figure 2:
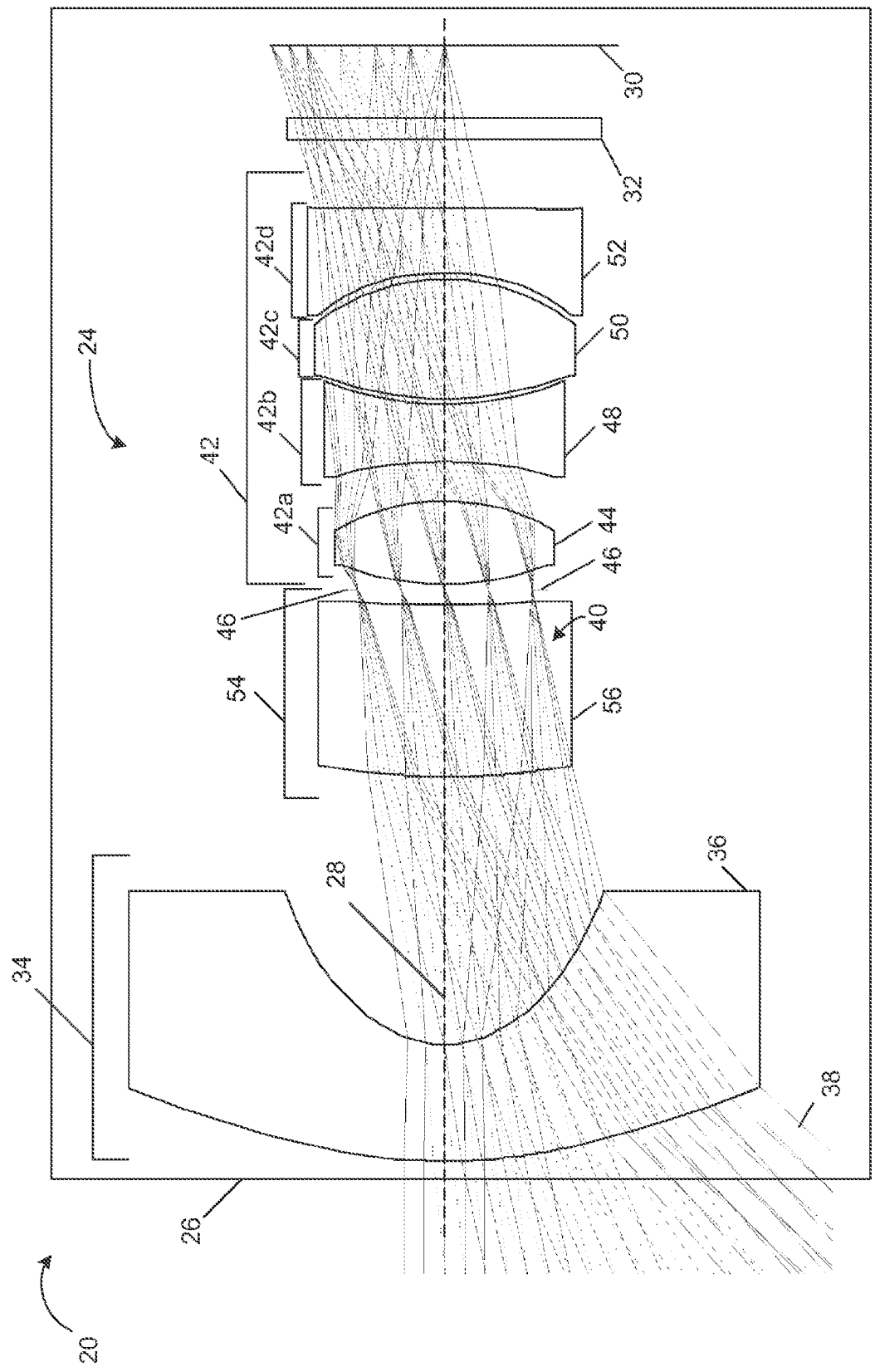
FIG. 2 shows a schematic diagram of an embodiment of a lens construction for use with an RGB imaging system.

FIG. 2 shows an embodiment of a lens construction 24 suitable for use in camera system 20 of FIG. 1. Lens construction 24 is positioned within a housing 26 that houses a plurality of optical components that are arranged along an optical axis 28 and configured to focus an image on an image sensor 30. Image sensor 30 may comprise any suitable type of image sensor, including but not limited to a CMOS and/or a CCD sensor.

In the depicted embodiment, lens construction 24 comprises two lens stages (described in more detail below), and also includes a infrared-cut filter 32 disposed between the sensor 30 and the scene being imaged to reduce the amount of infrared light reaching image sensor 30 relative to embodiments without such a filter. In the depicted embodiment, infrared-cut filter 32 is positioned immediately adjacent to image sensor 30 along optical axis 28 to filter infrared light at a location close to the image sensor 30. In other embodiments, the infrared-cut filter 32 may have any other suitable location.

Continuing with FIG. 2, a first, negative lens stage 34 is positioned at the front of lens construction 24 along optical axis 28. As used herein, the term "front" describes a position along optical axis 28 that is closest to a scene being imaged, and the term "rear" describes a position along optical axis 28 that is closest to image sensor 30. Further, the terms "negative" and "positive" as used with reference to the lens stages and lens substages refer to optical power.

The depicted first, negative lens stage 34 includes a first negative lens element 36. First negative lens element 36 comprises a convex front portion configured to bend incoming rays 38 and to decrease angles between the rays 38 and optical axis 28. First negative lens element 36 also comprises a concave rear portion configured to form diverging ray bundles 40. While a single lens is depicted for each lens element in FIG. 2, it will be understood that, in other embodiments, each lens element may comprise plural lenses that, when combined, have the respective optical characteristics described herein for each lens element, and that the term "element" as used herein also refers to such plural lens arrangements.

A second, positive lens stage 42 is positioned behind the first, negative lens stage 34 relative to a scene being imaged. Second, positive lens stage 42 focuses the diverging ray bundles 40 onto the sensor plane 30. Second, positive lens stage 42 comprises a first positive lens substage 42a, a first negative lens substage 42b, a second positive lens substage 42c, and a second negative lens substage 42d in order along optical axis 28. First positive lens substage 42a as depicted comprises a first positive lens element 44, which has a convex front portion and a convex rear portion to focus the diverging ray bundles 40, thereby converging the ray bundles 40. First positive lens element 44 is a stronger positive lens element than the remaining elements of the lens construction.

The aperture stop 46 of the lens construction 24 is positioned between first negative lens element 36 and first positive lens element 44. Positioning aperture stop 46 at this location may help reduce the height of rays 38 entering first negative lens element 36 in order to reduce the size of the first negative lens element 36.

First negative lens substage 42b further comprises a second negative lens element 48. Second negative lens element 48 includes a concave front portion that bends incoming ray bundles 40 from the first positive lens element 44 differently according to the incoming field angles of each ray 38 of ray bundles 40. In this example, the bending has a direct relationship with the field angle. Accordingly, the higher field angle the ray bundle 40 comes from, the more amount of bending the chief ray experiences. This may help to reduce distortion and field curvature of the lens construction.

Second positive lens substage 42c comprises a second positive lens element 50. Second positive lens element 50 includes convex front and rear portions that focus the ray bundles 40 and increases a convergence of ray bundles 40.

Third negative lens substage 42d comprises a third negative lens element 52. Third negative lens element 52 includes a concave front portion and slightly concave rear portion that, similarly to second negative lens element 48, bend incoming ray bundles 40 from the second positive lens element 50 differently according to the incoming field angles of each ray 38 of ray bundles 40, such that higher fields angles result in more bending action.

The combined sandwich structure of the second negative lens element 48, second positive lens element 50, and third negative lens element 52 has a weak combined optical power. Further, in some embodiments, the second negative lens element 48 and the third negative lens element 52 may be configured to have higher dispersion than second positive lens element 50. For example, in the lens construction 24, a sandwich structure which satisfies the following two equations may help to limit the effect of chromatic aberration:

$$\frac{P1}{V1} + \frac{P2}{V2} + \frac{P3}{V3} = 0,$$

and P1+P2+P3=0, where P1, P2, and P3 are the optical power of individual lens elements, and V1, V2, and V3 are the Abbe dispersion coefficients of individual lens elements. The placement of a low dispersion lens element with positive power sandwiched between two high dispersion lens elements with negative power may help to reduce chromatic aberration in the image transferred to image sensor 30.

In some embodiments, a weak lens stage 54 may be positioned between first, negative lens stage 34 and second, positive lens stage 42. The depicted embodiment of weak lens stage 54 comprises a weak lens element 56 that has a slightly convex front portion and slightly concave rear portion. This structure may result in an optical power that is substantially weaker than the remaining lens elements of lens construction 24. Accordingly, weak lens element 56 bends incoming rays a lesser degree than each of the other lens elements. However, the weak lens element 56 may help to reduce the height of rays 38 entering the first, negative lens stage 34, which may help to reduce the size of the lens construction 24 compared to lens constructions that omit weak lens element 56. Weak lens element 56 also may be used to balance aberrations before the ray bundles enter the second, positive lens stage 42 to enhance image quality.

The embodiment of FIG. 2, which is drawn approximately to scale, represents just one example configuration that may achieve an f-number less than or equal to 2.0 and a field of view (FoV) greater than or equal to 90 degrees. Such a combination of properties has heretofore pushed the limits of lens designs, such as retro-focus and fisheye lenses, where one desired property may be conceded to achieve the other property. It will be understood that this example is intended to be illustrative and not limiting, as other specific configurations of the above-described stages and substages likewise may achieve f-numbers and FoVs in such ranges.

The lens elements of the embodiment of FIG. 2 may be constructed in any suitable manner. For example, one or more lenses may be formed or composed from plastic and/or glass. The use of more plastic materials may help to reduce materials and manufacturing costs, while the use of more glass materials may help to improve thermal stability. In particular, the materials of the three sandwiched lens elements (second and third negative lens elements 48 and 52 and second positive lens element 50) may be different from one another and/or from the other lens elements of the lens construction 24 in order to correct color, reduce field of curvature and distortion, etc. The difference in materials may comprise, for example, a difference in refractive index of the materials. Further, one or more lens elements included in the lens construction 24 may have an aspheric lens surface to correct for rays falling on the peripherals of lens surfaces. This may help to reduce optical aberrations, thereby helping to open up the aperture size of the lens construction.

Figure 3:
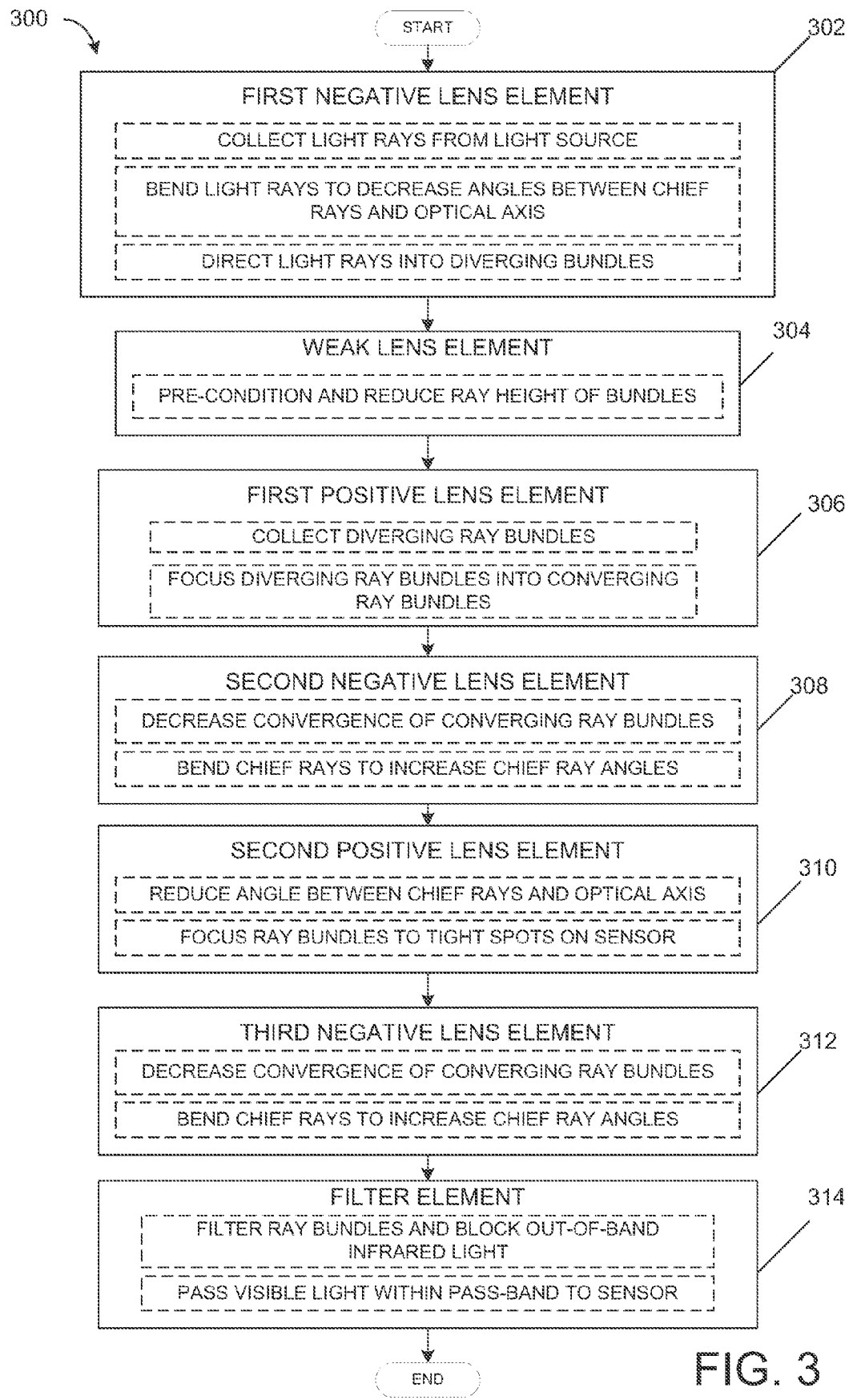
FIG. 3 is a flow diagram of an embodiment of a method of focusing an image on an image sensor via the lens construction of FIG. 2.

FIG. 3 shows an embodiment of a method 300 of focusing an image on an image sensor via the lens construction embodiment of FIG. 2. Method 300 comprises, at 302, utilizing a first negative lens element to collect light via a first negative lens element in a first, negative lens stage. The first negative lens element collects light rays from a light source, bends the light rays to decrease angles between the chief rays and an optical axis, and directs the light rays into diverging ray bundles.

Next, method 300 comprises, at 304, utilizing a weak lens element to collect diverging ray bundles, and to pre-condition and reduce the height of the ray bundles. At 306, method 300 comprises utilizing a first positive lens element in a second, positive lens stage to collect the diverging ray bundles, and focus the diverging bundles into converging ray bundles. At 308, method 300 comprises utilizing a second negative lens element to collect ray bundles, decrease a degree of convergence of the converging ray bundles, and bend the rays to increase chief ray angles. Then, at 310, method 300 comprises utilizing a second positive lens element to collect ray bundles and reduce an angle between the chief rays and the optical axis to focus the ray bundles to tight spots on a sensor element. Next, at 312, method 300 comprises utilizing a third negative lens element to collect ray bundles, decrease the convergence of the ray bundles, and bend chief rays to increase chief ray angles. Finally, at 314, method 300 comprises utilizing a filter element to filter ray bundles from the third negative lens element, block out-of-band infrared light, and pass visible light within a pass-band through to the sensor element.

The disclosed embodiments may allow for the production of a wide angle image with less distortion than a conventional wide-angle lens system. It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A wide-angle lens construction, comprising:
a first, negative stage; and
a second, positive stage positioned behind the first, negative stage along an optical axis of the lens construction, the second, positive stage comprising, in order along the optical axis of the lens construction:
a first positive lens substage,
a first negative lens substage,
a second positive lens substage, and
a second negative lens substage, and further comprising a weak lens stage positioned between the first, negative stage and the second, positive stage, the weak lens stage comprising a weak lens element that bends light a lesser degree than each of the lens substages, and wherein the first positive lens substage is stronger than the second positive lens substage.

2. The wide-angle lens construction of claim 1, wherein each lens substage comprises one or more lens elements.

3. The wide-angle lens construction of claim 2, wherein the one or more lens elements comprises a lens element with an aspheric lens surface.

4. The wide-angle lens construction of claim 1, further comprising an infrared-cut filter positioned behind the second negative lens substage along the optical axis, and an image sensor positioned behind the infrared-cut filter.

5. The wide-angle lens construction of claim 1, wherein the second positive lens substage comprises a lower dispersion than the first and second negative lens substages.

6. The wide-angle lens construction of claim 2, wherein one or more lens elements comprise plastic and one or more lens elements comprise glass.

7. The wide-angle lens construction of claim 1, wherein the lens construction comprises an f-number equal to or less than 2.0 and a field of view equal to or greater than 90 degrees.

8. An RGB camera comprising:
a lens construction, comprising:
a first, negative stage comprising a first negative lens element,
a second, positive stage positioned behind the first, negative stage along an optical axis of the lens construction comprising, in order along the optical axis:
a first positive lens element,
a second negative lens element,
a second positive lens element,
a third negative lens element, and
a weak lens stage, positioned between the first, negative stage and the second, positive stage, comprising a weak lens element;
a filter element positioned behind the third negative lens element along the optical axis; and
a sensor positioned behind the filter element along the optical axis, wherein the weak lens element is configured to bend incoming rays a lesser degree than each of the lens elements, and wherein the first positive lens element is a stronger positive lens element than the second positive lens element.

9. The RGB camera of claim 8, further comprising a lens element with an aspheric lens surface.

10. The RGB camera of claim 8, wherein the filter element comprises an infrared-cut filter.

11. The RGB camera of claim 8, wherein one or more lens elements comprise plastic and one or more lens elements comprise glass.

12. The RGB camera of claim 8, wherein the lens construction comprises an f-number equal to or less than 2.0, and a field of view (FoV) equal to or greater than 90 degrees.

13. A method of collecting light with an RGB camera comprising a first, negative lens stage comprising a first negative element; a second, positive lens stage comprising a first positive lens element, a second negative lens element, a second positive lens element, and a third negative lens element; and a weak lens stage comprising a weak lens element between the first, negative lens stage and the second, positive lens stage, the method comprising:
via the first, negative lens stage, collecting light rays from a light source, bending the light rays to decrease angles between chief rays and an optical axis, and diverging the light rays into diverging ray bundles;
via the weak lens stage, collecting the diverging ray bundles, and reducing ray height of the ray bundles;
via the second, positive lens stage,
collecting the ray bundles and focusing the diverging ray bundles into converging ray bundles via the first positive lens element,
bending chief rays to increase chief ray angles and diverging the ray bundles via the second negative lens element,
collecting the ray bundles, reducing an angle between the chief rays and the optical axis and focusing the ray bundles on tight spots on a sensor element via the second positive lens element, and
bending the chief rays to increase chief ray angles and diverging the ray bundles via the third negative lens element, wherein the weak lens element is weaker than all other lens elements and the first positive lens element is stronger than the second positive lens element.

14. The method of claim 13, further comprising, filtering the ray bundles from the third negative lens element via a filter element, and passing visible light through the filter element to a sensor.

15. The method of claim 13, wherein the RGB camera comprises an f-number less than or equal to 2.0 and a field of view (FoV) greater than or equal to 90 degrees.

* * * * *